United States Patent Office.

EDWARD HARRY CLOWSER, OF BOSTON, MASSACHUSETTS.

Letters Patent No. 98,849, dated January 18, 1870.

IMPROVED FOOD FOR HORSES AND CATTLE.

The Schedule referred to in these Letters Patent and making part of the same.

*To all persons to whom these presents shall come:*

Be it known that I, EDWARD HARRY CLOWSER, a subject of Great Britain, but at present sojourning at Boston, Suffolk county, Massachusetts, have made an invention of a new and useful Combination or Preparation of Various Materials for the Sustenance of Horses; and do hereby declare the following description to embrace the composite ingredients, as well as the mode of preparation of the same.

The characteristic or predominating elementary substances employed in this preparation are, First, grain of some one or more varieties, in its original condition, or malted, and hay and straw.

Second, beans, pease, &c., or any products of the same, whether plant, flower, seed, vine, &c.

Third, vegetables, in one or more varieties, either raw or cooked, chopped or ground, or products or residuum of the same.

Fourth, aromatic products.

These substances or materials, or equivalent to them, possessing either aromatic bitter carminatives, or other useful properties, are combined with caraway, cummin, fenugreek seed, &c., and to the whole is added a quantity of ginger and of gentian, as well as of salt.

The woody or fibrous materials, such as hay, peavines, &c., are to be finely cut, and the grain and vegetables ground, broken, or finely chopped, as the case may be.

To the compound composed as above, I add a small quantity of molasses, sugar, or other saccharine matter, and leaven the whole with yeast, and after kneading into dough, press or mould it into suitable form or cakes, which are subsequently hardened by baking or by exposure to sun and atmosphere.

The purposes of the ingredients hereinbefore mentioned in general, will be understood by experienced persons.

The malt is a very nutritious food in small bulk.

The aromatic substances impart a certain degree of odor and flavor to the compound, which induce a horse to entirely consume the amount given him.

The ginger has the effect of producing warmth, which, in many cases, is found very beneficial, while the gentian acts as a tonic to increase the animal's appetite.

The presence of saccharine matter renders the whole very attractive to horses, as is well known, while, finally, the yeast produces a lightness and porosity to the compound, which, in many respects, is highly desirable.

The advantages of a portable or condensed and compressed article of food, as above set forth, are, that mastication and digestion on the part of the animal are rendered much easier.

As the food contains all the elements necessary for the sustenance of a horse, his general health is thereby insured.

Owing to its concentrated nature, it gives a horse more time to rest, as the less time is occupied in feeding, while its condensed bulk and tenacious adhesion of ingredients prevent waste, whether fed to the animal in a manger or in a nose-bag.

The presence of dirt, dust, or foreign matter is avoided, while the food becomes a very convenient vehicle wherewith to administer medicine, should it become necessary.

It is susceptible of stowage into comparatively small compass, which is a matter of great importance on shipboard or in railway-transit, while to an army on the march it will be found very valuable.

By means of my invention, the danger of fire, now of frequent occurrence, from spontaneous combustion in hay-lofts, is avoided.

I have not, in the foregoing specification, given any proportions of ingredients, as these will vary so widely with different individuals, that given and determined proportions which would meet the wishes of one, would not answer at all for another.

As the ingredients are all well known, and in common use, the objects to be obtained in combining them will manifest themselves readily to persons experienced in the care of horses.

Claim.

I claim an article of food for horses, composed of ingredients and compounded in manner and for the purpose as hereinbefore stated.

EDW. H. CLOWSER.

Witnesses:
FRED. CURTIS,
E. GRIFFITH.